(12) United States Patent
Li et al.

(10) Patent No.: US 11,598,316 B2
(45) Date of Patent: Mar. 7, 2023

(54) ELECTRIC HEATING APPARATUS FOR DEICING, METHOD FOR MANUFACTURING THE SAME, BLADE AND WIND TURBINE INCLUDING THE SAME

(71) Applicant: BEIJING GOLDWIND SCIENCE & CREATION WINDPOWER EQUIPMENT CO., LTD., Beijing (CN)

(72) Inventors: Jie Li, Beijing (CN); Yanpeng Xie, Beijing (CN)

(73) Assignee: BEIJING GOLDWIND SCIENCE & CREATION WINDPOWER EQUIPMENT CO., LTD., Beijing (CN)

( * ) Notice: Subject to any disclaimer, the term of this patent is extended or adjusted under 35 U.S.C. 154(b) by 889 days.

(21) Appl. No.: 16/194,694

(22) Filed: Nov. 19, 2018

(65) Prior Publication Data
US 2019/0264658 A1    Aug. 29, 2019

(30) Foreign Application Priority Data
Feb. 27, 2018    (CN) .......................... 201810164383.4

(51) Int. Cl.
*F03D 80/40*    (2016.01)
*H05B 3/14*    (2006.01)
(Continued)

(52) U.S. Cl.
CPC .............. *F03D 80/40* (2016.05); *B29C 66/71* (2013.01); *F03D 7/0224* (2013.01); *H05B 3/145* (2013.01);
(Continued)

(58) Field of Classification Search
CPC ................................ F04D 80/40; B64D 15/12
See application file for complete search history.

(56) References Cited

U.S. PATENT DOCUMENTS 3,218,436 A * 11/1965 Edwards ................ B64D 15/12
252/502
4,656,339 A * 4/1987 Grise ....................... H05B 3/34
219/528
(Continued)

FOREIGN PATENT DOCUMENTS

CN    2082939 U    8/1991
CN    103005852 A    4/2013
(Continued)

OTHER PUBLICATIONS

The First Chinese Office Action dated Mar. 3, 2021; Appln. No. 201810164383.4.
(Continued)

*Primary Examiner* — Woody A Lee, Jr.
*Assistant Examiner* — Wesley Le Fisher

(57) ABSTRACT

An electric heating apparatus for deicing, a method for manufacturing the electric heating apparatus for deicing, a blade and a wind turbine including the same. The electric heating apparatus for deicing includes: a heat generating module, including a heat generating element and a bus bar for conducting electricity to the heat generating element, where the bus bar includes a lead-out portion for connecting an external power source; a thermally conductive encapsulating layer, which is insulated and is to cover the heat generating module except the lead-out portion; and a first substrate and a second substrate, respectively arranged below and above the thermally conductive encapsulating layer, so that the heat generating module and the thermally conductive encapsulating layer are arranged between the first substrate and the second substrate.

14 Claims, 3 Drawing Sheets

(51) Int. Cl.
    *F03D 7/02*     (2006.01)
    *H05B 3/86*     (2006.01)
    *H05B 3/34*     (2006.01)
    *H05B 3/18*     (2006.01)
    *H05B 3/36*     (2006.01)
    *B29C 65/00*     (2006.01)

(52) U.S. Cl.
    CPC ............... *H05B 3/146* (2013.01); *H05B 3/18* (2013.01); *H05B 3/34* (2013.01); *H05B 3/36* (2013.01); *H05B 3/86* (2013.01); *H05B 2203/017* (2013.01)

(56) References Cited

U.S. PATENT DOCUMENTS

| | | | | |
|---|---|---|---|---|
| 5,412,181 | A * | 5/1995 | Giamati | H05B 3/342 |
| | | | | 219/212 |
| 5,925,275 | A * | 7/1999 | Lawson | B64D 15/12 |
| | | | | 219/543 |
| 7,291,815 | B2 * | 11/2007 | Hubert | B64D 15/12 |
| | | | | 219/535 |
| 7,880,121 | B2 * | 2/2011 | Naylor | E04D 13/103 |
| | | | | 219/213 |
| 8,523,113 | B2 * | 9/2013 | Atkinson | H05B 3/286 |
| | | | | 244/134 D |
| 9,193,466 | B2 * | 11/2015 | Calder | B64D 15/12 |
| 11,332,632 | B2 * | 5/2022 | Xiao | C09D 11/102 |
| 2007/0193996 | A1 | 8/2007 | Nakajima et al. | |
| 2008/0099617 | A1 * | 5/2008 | Gilmore | F03D 80/40 |
| | | | | 244/134 R |
| 2011/0284515 | A1 * | 11/2011 | Akaike | H05B 3/342 |
| | | | | 219/211 |
| 2014/0199170 | A1 * | 7/2014 | Madsen | B23P 15/04 |
| | | | | 29/889.71 |
| 2016/0007474 | A1 * | 1/2016 | Dardona | H05B 3/34 |
| | | | | 264/129 |
| 2016/0021704 | A1 * | 1/2016 | Elverud | H05B 3/58 |
| | | | | 252/502 |
| 2017/0122295 | A1 * | 5/2017 | Klein | F03D 1/0675 |
| 2017/0129616 | A1 * | 5/2017 | Coat-Lenzotti | B05D 1/28 |
| 2017/0158898 | A1 * | 6/2017 | Xiao | H01C 7/04 |
| 2020/0154528 | A1 * | 5/2020 | Gima | B32B 7/02 |

FOREIGN PATENT DOCUMENTS

| | | | |
|---|---|---|---|
| CN | 103826336 | A | 5/2014 |
| CN | 204559908 | U | 8/2015 |
| CN | 105604812 | A | 5/2016 |
| CN | 205265933 | U | 5/2016 |
| CN | 106060983 | A | 10/2016 |
| CN | 206487595 | U | 9/2017 |
| CN | 107401486 | A | 11/2017 |
| CN | 107509260 | A | 12/2017 |
| CN | 206728318 | U | 12/2017 |
| CN | 107642465 | A | 1/2018 |
| EP | 2708740 | A1 | 3/2014 |
| WO | 2006/085054 | A1 | 8/2006 |
| WO | 2017/190748 | A1 | 11/2017 |

OTHER PUBLICATIONS

Extended European Search Report dated Jun. 13, 2019; Appln. No. 18210131.1.

The Second Chinese Office Action dated Oct. 9, 2021; Appln. No. 201810164383.4.

* cited by examiner

ELECTRIC HEATING APPARATUS FOR DEICING, METHOD FOR MANUFACTURING THE SAME, BLADE AND WIND TURBINE INCLUDING THE SAME

The present application claims priority to Chinese Patent Application No. 201810164383.4, titled "ELECTRIC HEATING APPARATUS FOR DEICING AND LIGHTNING PROTECTION, METHOD FOR MANUFACTURING THE SAME, BLADE AND WIND TURBINE INCLUDING THE SAME", filed on Feb. 27, 2018 with the Chinese Patent Office, which is incorporated herein by reference in its entirety.

TECHNICAL FIELD

The present disclosure relates to an electric heating apparatus for deicing, a method for manufacturing an electric heating apparatus for deicing, a blade and a wind turbine, and in particular, to an electric heating apparatus for deicing for a wind turbine and a method for manufacturing the electric heating apparatus for deicing, a blade including the electric heating apparatus for deicing, and a wind turbine including the electric heating apparatus for deicing.

BACKGROUND

With a shortage of energy sources and a growing environmental awareness throughout the world, wind power has become a new energy source that has widely used at present. Upon a change of climate, an icing phenomenon may be occurred at a rotor blade of a wind turbine under freezing rain, which has a great impact on the wind turbine.

With technology development, there are many manners for deicing, specifically, researches have been done on heating materials and heating processes. At present, a conventional deicing method for the icing blade of the wind turbine includes the followings. In a case that the ice on the blade accumulates to a certain extent, the wind turbine is stopped for deicing, or it is waited until temperature rises so that the ice is removed naturally, or in a case that the ice on the blade is not serious, the wind turbine is adjusted to operate with a reduced capacity. These manners reduce power generation efficiency of the wind turbine.

Chinese patent No. CN103826336A discloses a rotor blade including an electric heating apparatus for deicing for a wind turbine, an electric heat generating module, a molding apparatus and a molding method for the same. The electric heat generating module is laid on a blade, the electric heat generating module is woven by a carbon fiber material, and two side wires are introduced from an upper side and a lower side. In a case that the blade has been iced up, the electric heat generating module can be powered on and heated, so as to melt the ice on the blade.

As described above, the conventional electric heating module for deicing for the blade of the wind turbine (including the conducting element) are directly laid on the blade by connecting to the heat generating module via a wire. Such a manner brings a risk of lightning strikes to the wind turbine.

In addition, multiple layers are required to be laid in an installation process of the conventional apparatus for deicing, which modifies a surface of the blade greatly. It is inconvenient to install such an apparatus and to deice the blade which has been iced up.

SUMMARY

In order to address the issue that the electric heating module for deicing may result in a risk of lightning striking and is inconvenient to be installed, an electric heating apparatus for deicing, a method for manufacturing the electric heating apparatus for deicing, a blade and a wind turbine are provided according to the present disclosure.

An electric heating apparatus for deicing is provided according to an aspect of the present disclosure, including: a heat generating module, including a heat generating element and a bus bar for conducting electricity to the heat generating element, where the bus bar includes a lead-out portion for connecting an external power source; a thermally conductive encapsulating layer, which is insulated and is to cover the heat generating module except the lead-out portion; and a first substrate and a second substrate, respectively arranged below and above the thermally conductive encapsulating layer, so that the heat generating module and the thermally conductive encapsulating layer are arranged between the first substrate and the second substrate.

Preferably, at least one of the heat generating element and the bus bar may be coated with an insulating coating.

Preferably, the insulating coating may be formed by a thermoplastic insulating adhesive or a thermosetting insulating adhesive.

Preferably, the heat generating element may be carbon fiber bundles arranged in parallel or a mesh of carbon fiber bundles.

Preferably, at least one of the thermally conductive encapsulating layer, the first substrate, and the second substrate may be transparent.

Preferably, the thermally conductive encapsulating layer may be formed by an EVA (ethylene-vinyl acetate copolymer) material or a PVB (polyvinyl butyral resin) material.

Preferably, the first substrate and the second substrate may be formed by a PET (polyethylene terephthalate) material, or the first substrate and the second substrate may be formed by different materials.

Preferably, a side surface of the thermally conductive encapsulating layer may be exposed to an outer air.

A blade of a wind turbine is provided according to another aspect of the present disclosure, where the aforementioned electric heating apparatus for deicing may be provided at a surface of a leading edge of the blade or a surface of a trailing edge of the blade.

A wind turbine is provided according to another aspect of the present disclosure, including the aforementioned blade.

A method for manufacturing an electric heating apparatus for deicing is provided according to another aspect of the present disclosure, including: laying a first substrate; laying, on the first substrate, a first thermally conductive encapsulating material, a heat generating module, a second heat conductive encapsulating material, and a second substrate in the sequence listed; and heating and pressing said multilayer structure to form a laminate, so that the first thermally conductive encapsulating material and the second thermally conductive encapsulating material cover a remaining portion of the heat generating module except a lead-out portion for connecting an external power supply.

With the electric heating apparatus for deicing according to the present disclosure, a conductive portion of the apparatus is fully encapsulated for insulation. Therefore, even in a case that the electric heating apparatus for deicing is for deicing or anti-icing the blade by electric heating under a lightning weather, inductive charges can be avoided, and a risk of lightning strikes is reduced. In particular, the insulation performance of the apparatus can be further improved in a case that the heat generating element is coated with an insulating coating.

The electric heating apparatus for deicing according to the present disclosure is integrally formed, which has a small overall thickness and a compact structure. The modification on the blades due to installation of the apparatus for deicing in the conventional technology is avoided. In addition, such an integrated electric heating apparatus for deicing is simple to lay and install, and is suitable for deicing the blade which has been iced up.

REFERENCE SIGNS

100: electric heating apparatus for deicing;
110: heat generating module;
111: heat generating element;
112: bus bar;
120: thermally conductive encapsulating layer;
131: first substrate;
132: second substrate.

DETAILED DESCRIPTION OF THE EMBODIMENTS

Figure 1:
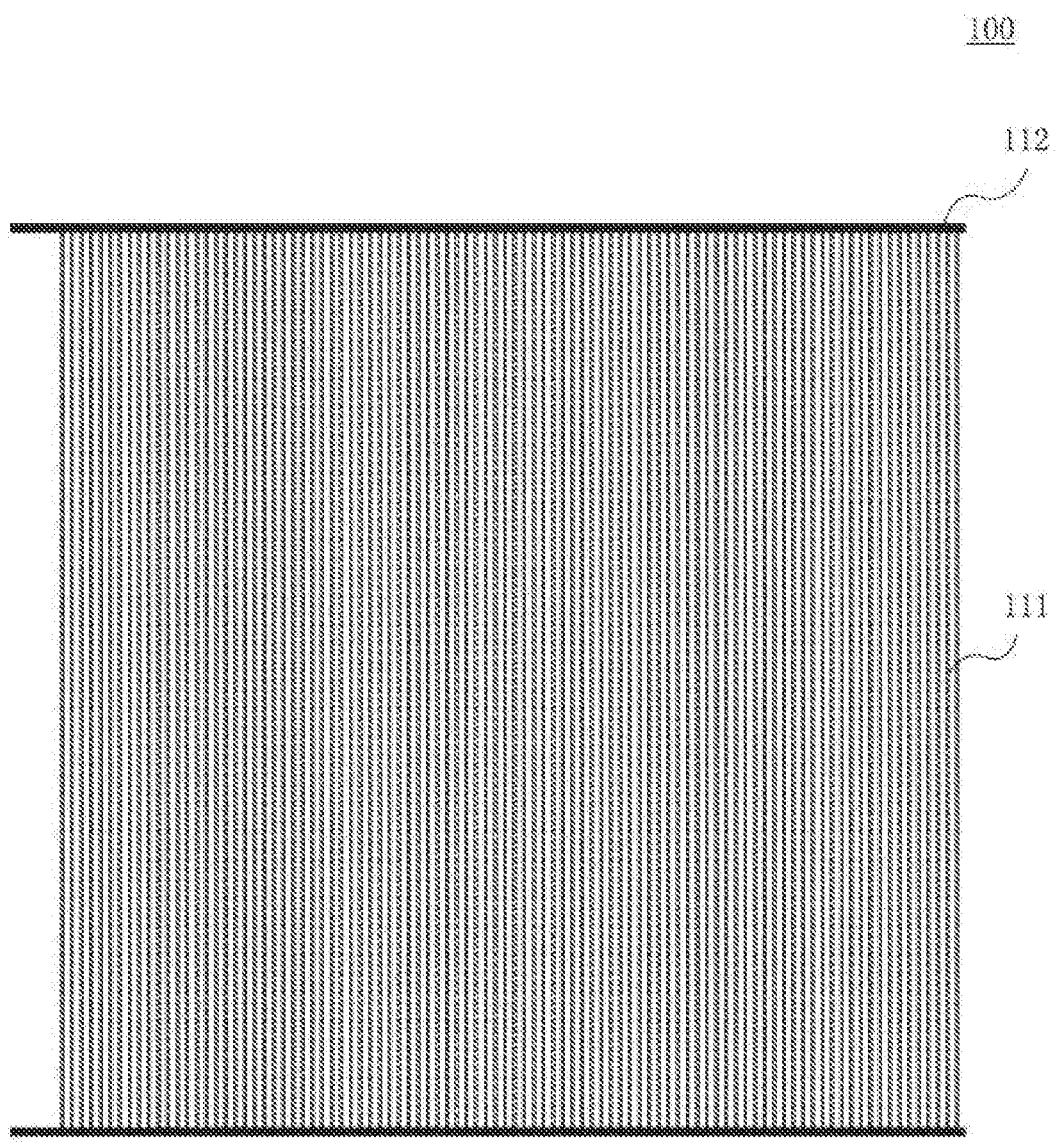
FIG. 1 is a plan view of an electric heating apparatus for deicing according to an exemplary embodiment of the present disclosure.

Hereinafter exemplary embodiments of the present disclosure are described in detail with reference to FIGS. 1 to 4. In order to show structural details of an electric heating apparatus for deicing in FIG. 1 clearly, a distance between bus bars 112 of the electric heating apparatus for deicing in FIG. 1 is greatly reduced in FIG. 2.

As shown in FIG. 1 to FIG. 4, an electric heating apparatus for deicing 100 according to an exemplary embodiment of the present disclosure includes a heat generating module 110, a thermally conductive encapsulating layer 120, a first substrate 131, and a second substrate 132. The heat generating module 110 includes a heat generating element 111 and a bus bar 112 for conducting electricity to the heat generating element 111. The bus bar 112 includes a lead-out portion for connecting an external power source. The thermally conductive encapsulating layer 120 is insulating, and covers the heat generating module 110 except the lead-out portion. The first substrate 131 and the second substrate 132 are respectively arranged below and above the thermally conductive encapsulating layer 120, so that the heat generating module 110 and the thermally conductive encapsulating layer 120 are arranged between the first substrate 131 and the second substrate 132.

When powered via the bus bar 112, the heat generating element 111 may generate heat for deicing or anti-icing. The heat generating element 111 may be carbon fiber bundles arranged in parallel. Both ends of the carbon fiber bundles each may be respectively connected to bus bars 112. An end of the bus bar 112 may be extending outwardly from the electric heating apparatus for deicing 100 to form the lead-out portion (as shown in FIG. 1), which is for electrical connection to the external power source, so that electricity is conducted to the heat generating element 111 that is encapsulated inside the electric heating apparatus for deicing 100 via the bus bar 112. A distance between two adjacent carbon fiber bundles may range from 5 min to 20 mm inclusive. In addition, the heat generating element 111 may be a mesh of carbon fiber bundles. In a case the heat generating element 111 is formed by the carbon fiber bundles, an end portion of the heat generating element 111 may be connected to the bus bar 112 by point welding using, for example, a conductive silver paste. A material, a shape, and an arrangement of the heat generating element 111 are not limited thereto, as long as heat is generated due to resistance of the heat generating element when a current is applied thereto.

Preferably, an insulating coating 113 may be coated on the heat generating element 111. For example, an insulating material, such as a thermoplastic insulating paste or a thermosetting insulating paste, may be coated on an outer surface of the heat generating element 111, so that the surface of the heat generating element 111 is insulated from the outside. An insulation performance of the apparatus is improved.

Figure 2:
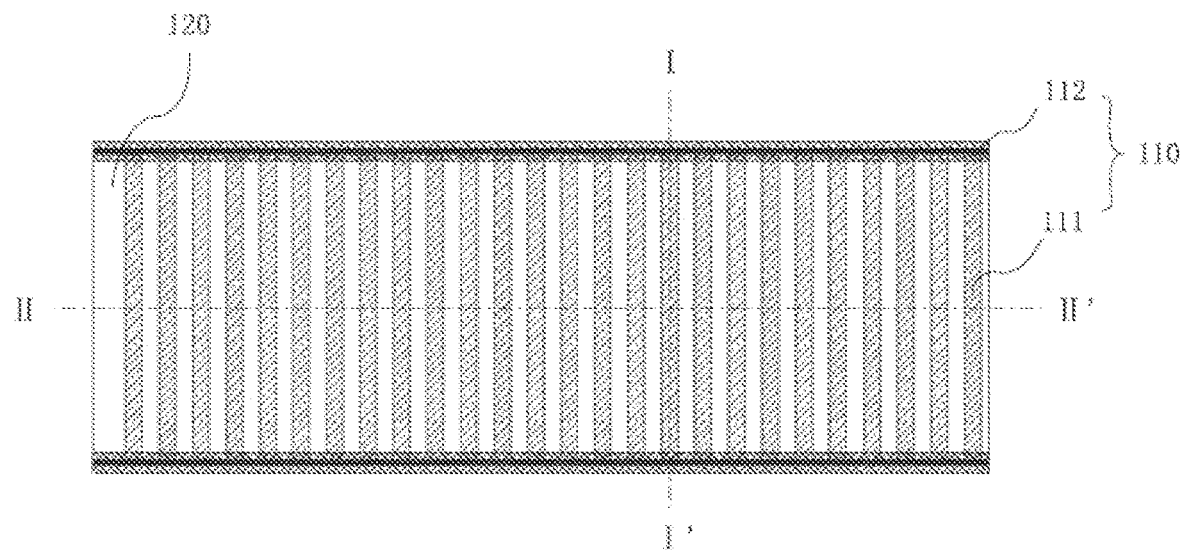
FIG. 2 is an enlarged structural diagram of an electric heating apparatus for deicing according to an exemplary embodiment of the present disclosure.

The bus bar 112 may be a bus which is connected to all the heat generating elements 111, as shown in FIG. 1 and FIG. 2. The bus bar 112 may also be multiple separate lead wires each of which is respectively connected to one or more heat generating elements 111. The bus bar 112 may be a conductive connection device such as a wire and a bus bar for lamination. Preferably, a width of the bus bar 112 may range from 6 mm to 10 mm inclusive, and a thickness of the bus bar 112 may range from 1 mm to 5 mm inclusive. A material of the bus bar 112 may include one or more of aluminum (Al), silver (Ag), tin (Sn), copper (Cu), and zinc (Zn). The bus bar 112 is not limited to the aforementioned structure. A suitable shape and a suitable material may be selected according to a practical requirement, as long as the bus bar 112 can be used for conducting electricity to the heat generating element 111. Similarly, an insulating coating 113 may be coated on the bus bar 112, so as to improve an insulation performance.

Figure 3:
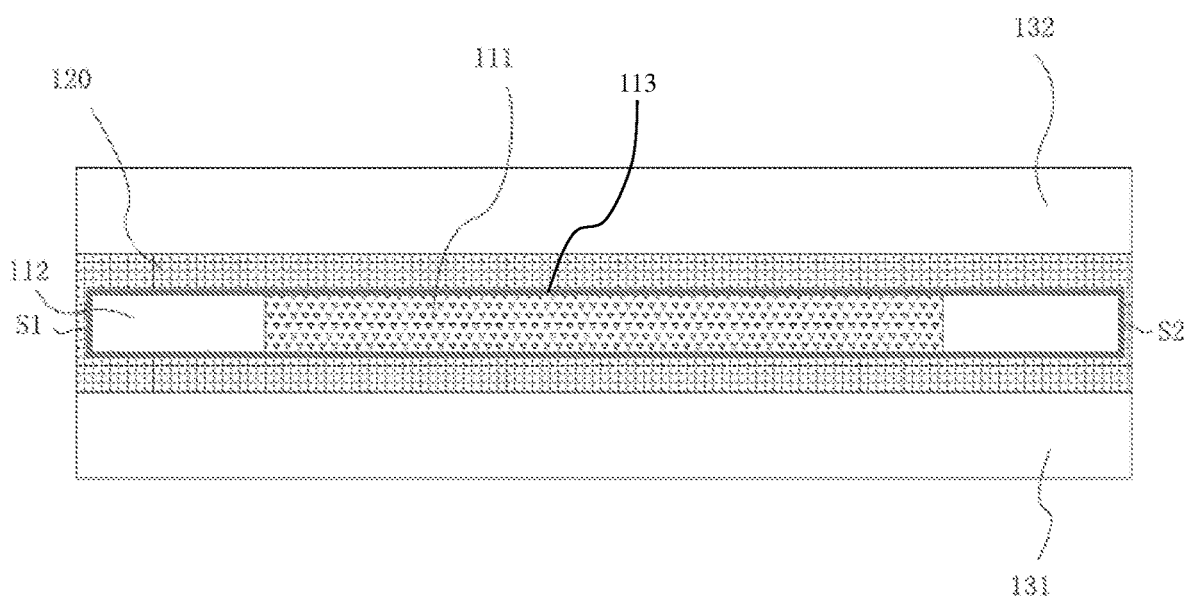
FIG. 3 is a cross-sectional diagram, along line I-I' in FIG. 2, of an electric heating apparatus for deicing according to an exemplary embodiment of the present disclosure.

The thermally conductive encapsulating layer 120 is an insulating layer covering the heat generating module 110, which can insulate the heat generating module 110 from the outside, protect the heat generating module 110, and conduct heat generated by the heat generating module 110 to outside. As shown in FIG. 3, the thermally conductive encapsulating layer 120 may fully cover the heat generating module 110 including side surfaces S1 and S2 of the bus bar 112.

The thermally conductive encapsulating layer 120 may be formed by a material, such as a thermally conductive and electrically insulating polymer. For example, during a manufacturing process, a material for forming the thermally conductive encapsulating layer 120 may be first laid on an upper surface and a lower surface of the heat generating module 110; the material is heated to be at a flow state; then the material at the flow state is filled, by pressing, into a gap of the heat generating module 110, and covers the upper surface, the lower surface and a side surface of the heat generating module 110; and finally the material at the flow state is solidified so as to form the thermally conductive encapsulating layer 120.

Since the thermally conductive encapsulating layer 120 can fill and cover the heat generating module 110, the heat generating module 110 is fully encapsulated inside the thermally conductive encapsulating layer 120 which is insulating, except for the lead-out portion of the bus bar 112 which is for an external connection. A conductive portion of the electric heating apparatus for deicing 100 may be fully encapsulated for insulation.

The material of the thermally conductive encapsulating layer 120 may include an EVA (ethylene vinyl acetate copolymer) material or a PVB (polyvinyl butyral resin) material. Preferably, the thermally conductive encapsulating layer 120 may be formed by a transparent material, such as the EVA material. Intactness of an internal structure after the thermally conductive encapsulating layer 120 is solidified, for example, whether the heat generating element 111 is damaged or the like, can be observed easily. As an example, a thickness of the EVA material or the PVB material may be approximately 0.38 mm or a multiple of 0.38 mm.

The first substrate 131 and the second substrate 132 cover a lower surface and an upper surface of the thermally conductive encapsulating layer 120, which are outer surfaces of the electric heating apparatus for deicing 100 and for protecting the internal structure of the electric heating apparatus for deicing 100 from an external environment. The first substrate 131 and the second substrate 132 may be insulating, so as to further encapsulate the heat generating module 110 for insulation.

During the manufacturing process, the first substrate 131 and the second substrate 132 may serve as a substrate (or frame) structure for a heating and pressing process. For example, in the aforementioned process of forming the thermally conductive encapsulating layer 120, the first substrate 131 and the second substrate 132 are laid as a lowermost layer and an uppermost layer, so as to sandwich the thermally conductive encapsulating material and the heat generating module 110 between the two substrates. In the pressing process, the substrate layer may be pressed to cause the thermally conductive encapsulating layer 120 to be formed.

A material of the first substrate 131 and the second substrate 132 may include a thermoplastic polyester material, such as a PET (polyethylene terephthalate) material. Preferably, the first substrate 131 and the second substrate 132 may be formed by a transparent material, such as the PET material. Intactness of the internal structure after the entire apparatus is formed can be observed easily. As an example, a thickness of the PET material may range from 1 mm to 3 mm inclusive. The materials of the first substrate 131 and the second substrate 132 are not limited to the above materials, as long as said materials can serve as a pressing substrate for the material of the thermally conductive encapsulating layer 120 during the manufacturing process. In addition, at least one of the thermally conductive encapsulating layer 120, the first substrate 131, and the second substrate 132 may be transparent. For example, as shown in FIG. 1 and FIG. 2, the thermally conductive encapsulating layer 120, the first substrate 131, and the second substrate 132 are all transparent.

Figure 4:
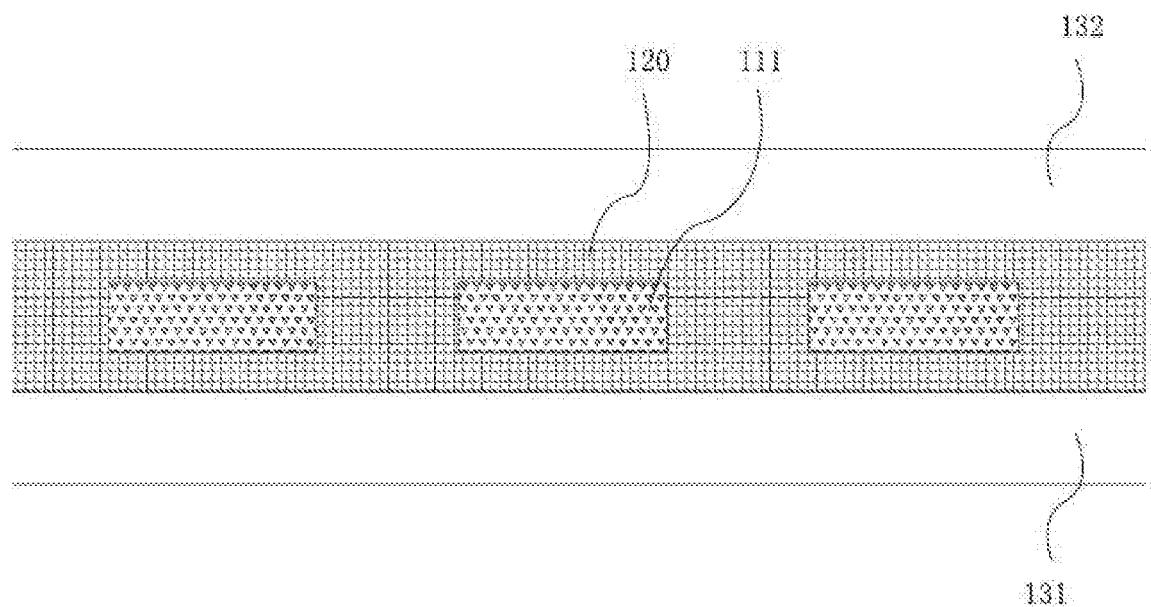
FIG. 4 is a partial cross-sectional diagram, along line II-II' in FIG. 2, of an electric heating apparatus for deicing according to an exemplary embodiment of the present disclosure.

Although the first substrate 131 and the second substrate 132 is formed by the same material as shown in FIG. 3 and FIG. 4, the first substrate 131 and the second substrate 132 may also be formed by different materials. For example, the first substrate 131, which is close to an outside portion of the blade, may have a better thermal conductivity and electrical insulation performance than those of the second substrate 132, which is close to an inside portion of the blade, so that a better deicing, anti-icing and insulation may be realized.

In the above structure, a two-layer encapsulation for insulation of the heat generating module 110 which is conductive can be realized by the thermally conductive encapsulating layer 120, the first substrate 131 and the second substrate 132, so that the electric heating apparatus for deicing 100 has a good insulation. Therefore, even in a case that the electric heating apparatus for deicing 100 is used for deicing or anti-icing of the blades by electric heating under a lightning weather, inductive charges can be avoided, and a risk of lightning strikes is reduced. In addition, the insulation performance of the apparatus can be further improved in a case that the heat generating element 111 is coated with an insulating coating 113.

The wind turbine according to the present disclosure may include a blade, where the aforementioned electric heating apparatus for deicing 100 may be provided on a surface of the blade. For example, the electric heating apparatus for deicing 100 may be laid on a portion close to the leading edge or the trailing edge of the blade. Thereby, the electric heating apparatus for deicing 100 is powered and heated in case of icing or a drop in temperature, thereby performing deicing or anti-icing on the blade while avoiding the risk of lightning strikes.

The electric heating apparatus for deicing 100 according to the present disclosure can avoid the risk of lightning strikes while performing deicing or anti-icing, and the structure of which is integrally formed and has a small overall thickness. This can reduce modification on the blade due to the installation of the apparatus for deicing. The electric heating apparatus for deicing 100 is simple to lay and install, and is also suitable for deicing the blade which has been iced up.

A method for manufacturing the electric heating apparatus for deicing 100 according to the present disclosure may include the following steps.

A first substrate 131 is laid. The first substrate 131 may be a thermoplastic polyester material, such as a PET material.

A first thermally conductive encapsulating material is then laid on the first substrate 131. The first thermally conductive encapsulating material may be, for example, an EVA (ethylene vinyl acetate copolymer) material or a PVB (polyvinyl butyral resin) material. Preferably, the first thermally conductive encapsulating material may be a transparent material.

A heat generating module 110 is then laid on the first thermally conductive encapsulating material, and a second thermally conductive encapsulating material is laid on the heat generating module 110. The method for manufacturing the electric heating apparatus for deicing 100 according to the present disclosure may further include that an insulating coating 113 is coated in advance on the heat generating module 110 before the heat generating module 110 is laid. The insulating coating 113 may be formed by an insulating material, such as a thermoplastic insulating adhesive and a thermosetting insulating adhesive. The heat generating module 110 may include a heat generating element 111 and a bus bar 112 electrically connected to the heat generating element 111. The heat generating element 111 may be powered via the bus bar 112. The second thermally conductive encapsulating material may be same as the first thermally conductive encapsulating material.

A second substrate 132 is then laid on the second thermally conductive encapsulating material. The second substrate 132 may be a thermoplastic polyester material such as a PET material. The second substrate 132 may be formed by the same or a different material as the first substrate 131. For example, the materials of the first substrate 131 and the second substrate 132 may have different thermal conductivity and electrical insulation.

The multi-layer structure is heated, so that the first thermally conductive encapsulating material and the second thermally conductive encapsulating material are in a flow state. The multi-layer structure is formed by being pressed by a laminator or by an autoclave and a roller machine, so that the thermally conductive encapsulating material fills and encapsulates the heat generating module 110, and the thermally conductive encapsulating layer 120 is formed.

Finally, after a process such as a degassing, the multi-layer structure which is pressed as a laminate is solidified to form the electric heating apparatus for deicing 100. Preferably, side surfaces of the first thermally conductive encapsulating material and second thermally conductive encapsulating material are exposed to an outer air to facilitate the degassing processing.

According to the electric heating apparatus for deicing 100 of the present disclosure, the conductive portion of the apparatus is fully encapsulated for insulation. Therefore, even in a case that the electric heating apparatus for deicing 100 is used for deicing or anti-icing of the blades by electric heating under a lightning weather, inductive charges can be avoided, and a risk of lightning strikes is reduced. In particular, the insulation performance of the apparatus can be further improved in a case that the heat generating element 111 is coated with an insulating coating 113.

The electric heating apparatus for deicing 100 according to the present disclosure is integrally formed, which has a small overall thickness and a compact structure. The modification on the blades due to the installation of the apparatus for deicing in the conventional technology is avoided. In addition, such an integrated electric heating apparatus for deicing 100 is simple to lay and install, and is suitable for deicing the blade which has been iced up.

Although the present disclosure has been described in detail with reference to the exemplary embodiments, it should be noted that various changes may be made by those skilled in the art to the forms and details of the present disclosure without departing from the spirit and the scope, which are defined by the claims, of the present disclosure.

The invention claimed is:

1. An electric heating apparatus for deicing, comprising:
   a heat generating module, comprising a heat generating element and a bus bar for conducting electricity to the heat generating element, wherein the bus bar comprises a lead-out portion for connecting an external power source;
   a thermally conductive encapsulating layer, which is insulated and covering the heat generating module except the lead-out portion; and
   a first substrate and a second substrate, respectively arranged below and above the thermally conductive encapsulating layer, so that the heat generating module and the thermally conductive encapsulating layer are arranged between the first substrate and the second substrate;
   wherein the first substrate is closer to a surface than the second substrate, and the surface is a target of the deicing; and
   wherein an electrical conductivity of the first substrate is smaller than an electrical conductivity of the second substrate, and a thermal conductivity of the first substrate is greater than a thermal conductivity of the second substrate.

2. The electric heating apparatus for deicing according to claim 1, wherein at least one of the heat generating element and the bus bar is coated with an insulating coating, and the insulating coating is different from the thermally conductive encapsulating layer.

3. The electric heating apparatus for deicing according to claim 2, wherein the insulating coating is formed by a thermoplastic insulating adhesive or a thermosetting insulating adhesive.

4. The electric heating apparatus for deicing according to claim 1, wherein the heat generating element is carbon fiber bundles arranged in parallel or a mesh of carbon fiber bundles.

5. The electric heating apparatus for deicing according to claim 1, wherein at least one of the thermally conductive encapsulating layer, the first substrate, and the second substrate is transparent.

6. The electric heating apparatus for deicing according to claim 1, wherein the thermally conductive encapsulating layer is formed by an EVA material or a PVB material.

7. The electric heating apparatus for deicing according to claim 6, wherein a thickness of the EVA material or a thickness of the PVB material is 0.38 mm.

8. The electric heating apparatus for deicing according to claim 1, wherein the first substrate or the second substrate is formed by a PET material.

9. The electric heating apparatus for deicing according to claim 8, wherein a thickness of the PET material ranges from 1 mm to 3 mm.

10. The electric heating apparatus for deicing according to claim 1, wherein a side surface of the thermally conductive encapsulating layer is exposed to an outer air.

11. The electric heating apparatus for deicing according to claim 1, wherein a thickness of the bus bar ranges from 1 mm to 5 mm.

12. A blade of a wind turbine, wherein the electric heating apparatus for deicing according to claim 1 is provided at a surface of a leading edge of the blade or a surface of a trailing edge of the blade.

13. A wind turbine, comprising the blade according to claim 12.

14. A method for manufacturing an electric heating apparatus for deicing, comprising:
   laying a first substrate;
   laying, on the first substrate, a first thermally conductive encapsulating material, a heat generating module, a second thermally conductive encapsulating material, and a second substrate in the sequence listed; and
   heating and pressing said multi-layer structure to form a laminate, so that the first thermally conductive encapsulating material and the second thermally conductive encapsulating material cover a remaining portion of the heat generating module except a lead-out portion for connecting an external power supply;
   wherein the heat generating module comprises a heat generating element and a bus bar for conducting electricity to the heat generating element, the bus bar comprises the lead-out portion, and the heat generating module except the lead-out portion is insulated from the first thermally conductive encapsulating material and the second thermally conductive encapsulating material;
   wherein the first substrate is closer to a surface than the second substrate, and the surface is a target of the deicing; and
   wherein an electrical conductivity of the first substrate is smaller than an electrical conductivity of the second substrate, and a thermal conductivity of the first substrate is greater than a thermal conductivity of the second substrate.

\* \* \* \* \*